United States Patent [19]

Lallier et al.

[11] Patent Number: 5,308,527

[45] Date of Patent: May 3, 1994

[54] APROTIC POLAR SOLVENT/ETHER PAINT STRIPPING COMPOSITIONS

[75] Inventors: Jean-Pierre Lallier, Paris; Patrick Marie, Houilles, both of France

[73] Assignee: Atochem, Puteaux, France

[21] Appl. No.: 803,532

[22] Filed: Dec. 9, 1991

[30] Foreign Application Priority Data

Dec. 7, 1990 [FR] France .................. 90 15344

[51] Int. Cl.$^5$ .................. C11D 7/50; C11D 7/34; C11D 7/26; C09D 9/00
[52] U.S. Cl. .................. 252/162; 134/38; 252/153; 252/171; 252/542; 252/549; 252/DIG. 8
[58] Field of Search .......... 134/38; 252/153, 162, 252/171, 542, 549, DIG. 8

[56] References Cited

U.S. PATENT DOCUMENTS

| | | | |
|---|---|---|---|
| 2,694,658 | 11/1954 | Crepeau et al. | 134/26 |
| 3,673,099 | 6/1972 | Corby et al. | 252/156 |
| 4,098,719 | 7/1978 | Hushebeck | 252/364 |
| 4,120,810 | 10/1978 | Palmer | 252/153 |
| 4,401,748 | 8/1983 | Ward, Jr. | 252/153 |
| 4,428,871 | 1/1984 | Ward | 252/153 |
| 4,444,648 | 4/1984 | West | 208/33 |
| 4,661,209 | 4/1987 | Berg | 585/856 |
| 4,664,721 | 5/1987 | Valasek | 134/40 |
| 4,836,950 | 6/1989 | Madsen | 252/171 |
| 4,983,224 | 1/1991 | Mombrun | 252/171 |
| 5,015,410 | 5/1991 | Sullivan | 252/171 |
| 5,085,795 | 2/1992 | Narayanan | 252/171 |

FOREIGN PATENT DOCUMENTS

| | | | |
|---|---|---|---|
| 549129 | 11/1957 | Canada | 252/171 |
| 86/03766 | 7/1986 | PCT Int'l Appl. | |
| 88/06640 | 9/1988 | PCT Int'l Appl. | |

*Primary Examiner*—Christine Skane
*Assistant Examiner*—Michael P. Tierney
*Attorney, Agent, or Firm*—Burns, Doane, Swecker & Mathis

[57] ABSTRACT

Inexpensive paint stripper compositions, containing neither chlorinated, aromatic nor alkaline solvents and well adopted for removing glycerophthalic, alkyd-urethane, acrylic-polyurethane and epoxy paints from a variety of substrates, e.g., wood and metal substrates, comprise (a) from 1% to 20% by volume of an aprotic polar solvent selected from among dimethylsulfoxide, dimethylformamide, N-methylpyrrolidone, N-methylmorpholine, γ-butyrolactone, acetonitrile and mixtures thereof; and (b) from 99% to 80% by volume of an ether selected from among methyltert-butylether, diethylether, tert-amylmethylether, tetrahydrofuran, dioxane and mixtures thereof.

13 Claims, No Drawings

APROTIC POLAR SOLVENT/ETHER PAINT STRIPPING COMPOSITIONS

BACKGROUND OF THE INVENTION

1. Field of the Invention

The present invention relates to novel paint stripping compositions and, more especially, to novel paint stripping compositions containing neither chlorinated, aromatic nor alkaline solvents.

2. Description of the Prior Art

U.S. Pat. No. 3,600,322 describes the use of mixtures of methylene chloride and methanol for stripping paint, varnish or lacquers. Paint stripping compositions containing lactams or lactones, particularly N-methyl-2-pyrrolidone or γ-butyrolactone, in admixture with other active compounds, for example alkylene glycol ethers, are also known to this art. Compare in this respect WO 86/03,766 and WO 88/06,640 and U.S. Pat. Nos. 5,011,121 and 5,015,410.

U.S. Pat. No. 2,694,658 describes the use of DMSO as a solvent for paint stripping applications.

Nonetheless, all of the above solvents present the disadvantages of being expensive and of being present in the compositions in considerable amounts. Thus, serious need exists in the surface coating removal industry for stripping formulations that are as effective as those of the prior art, but which are significantly less expensive.

SUMMARY OF THE INVENTION

Accordingly, a major object of the present invention is the provision of improved paint stripping compositions which avoid or conspicuously ameliorate the above disadvantages and drawbacks to date characterizing the state of this art.

Briefly, the present invention features novel paint stripping compositions comprising, by volume:

(a) 1% to 20% of an aprotic polar solvent selected from among dimethylsulfoxide (DMSO), dimethylformamide (DMF), N-methyl-pyrrolidone (NMP), N-methyl-morpholine (NMn), γ-butyrolactone (BLo), acetonitrile (AcN) and mixtures thereof; and (b) 99% to 80% of an ether selected from among methyl-tert-butylether (MTBE), diethylether (Et$_2$O), tert-amylmethylether (TAME), tetrahydrofuran (THF), dioxane (Dx) and mixtures thereof.

DETAILED DESCRIPTION OF THE PREFERRED EMBODIMENTS OF THE INVENTION

More particularly according to the present invention, in a preferred embodiment thereof, the aprotic polar solvent and the ether are present in the respective amounts of 5% to 15% and 95% to 85% by volume, and more preferably they are present in a ratio by volume of about 10/90.

Preferably, the ether is selected from among methyl-tert-butylether, diethylether, tert-amylmethylether and mixtures thereof. Advantageously, such ether is methyl-tert-butylether.

In another embodiment of the invention, the ether is selected from among tetrahydrofuran, dioxane and mixtures thereof.

In a particularly preferred embodiment of the invention, the aprotic polar solvent is dimethylsulfoxide.

Preferably, the composition comprises DMSO and MTBE in a volume ratio of 5/95 to 15/85, advantageously about 10/90.

The compositions according to the invention can also contain conventional additives. Exemplary such additives include a co-solvent, an activator, a fireproofing agent, a thickener, a stabilizer, a surfactant, an evaporation inhibitor and in general, any additive provided it is not a chlorinated or aromatic compound. In particular, incorporation of fatty matter, of animal or vegetable origin, for example certain esterified fractions emanating from petroleum processing, permits the flammability of the mixture to be reduced. Cellulosic derivatives, such as methyl cellulose, or aerosils (such as pyrogenic silica), can be added to thicken the mixture of solvents.

The addition of a surfactant accelerates the stripping operation. The stripping is likewise accelerated when methanol is added.

In one embodiment of the present invention, the composition additionally includes a fluorinated surfactant. The fluorinated surfactant is preferably a compound of the formula:

$$C_6F_{13}(OCH_2CH_2)_nH.$$

Such a surfactant, where n=10, is commercially available under the trademark FORAFAC® 1110.

The compositions according to the present invention can be produced by simply mixing the various components using a stirring or agitating means, or any appropriate apparatus. The compositions of the invention are used for paint removal or stripping. The invention, hence, also features the use of such compositions for stripping various types of paints from a variety of surfaces and substrates.

Thus, the invention provides a stripping composition, for stripping glycerophthalic paints from a wood substrate, wherein the solvent is dimethylsulfoxide and the ether is selected from among diethylether, methyl-tert-butylether, tert-amyl-methylether and mixtures thereof.

Similarly, the invention also provides a stripper composition for stripping alkyd-urethane paints from a wood substrate, wherein the solvent is dimethylsulfoxide and the ether is selected from among diethylether, methyl-tert-butylether, tert-amylmethylether and mixtures thereof.

The invention also provides a stripper composition for stripping alkyd-urethane paints from a wood substrate, wherein the ether is tetrahydrofuran and the solvent is selected from among dimethylsulfoxide, dimethylformamide, N-methyl-pyrrolidone, N-methylmorpholine, γ-butyrolactone, acetonitrile and mixtures thereof.

Similarly the invention provides a stripper composition for stripping of acrylic-polyurethane paints from a metal substrate, wherein the solvent is dimethylsulfoxide and the ether is selected from among tetrahydrofuran, dioxane and mixtures thereof.

The invention also provides a stripper composition for stripping acrylic-polyurethane paints from a metal substrate, wherein the ether is tetrahydrofuran and the solvent is selected from among dimethylsulfoxide, dimethylformamide, N-methylpyrrolidone, N-methylmorpholine, γ-butyrolactone, acetonitrile and mixtures thereof.

Too, the invention provides a stripper composition for stripping epoxy paints from a metal substrate, wherein the solvent is dimethylsulfoxide and the ether is selected from among diethylether, methyltertbutylether, tert-amyl-methylether and mixtures thereof.

The present invention also features a technique for removing paints and coatings from substrates by contacting such paints or coatings with the compositions described above. Preferably, the paints are those typically used in the construction industry and the substrate is wood.

The stripping process is carried out by contacting the object or surface that is to be stripped with a composition according to the present invention. Such contacting is continued until the paint swells, forms blisters and becomes detached. The substrate or surface to be stripped can be contacted with a composition according to the present invention in a variety of ways. Exemplary thereof are immersion, squirting, soaking using a paint brush, etc. The contacting is carried out at a temperature ranging from 5° to 25° C., namely, at ambient temperature. The contact time typically ranges from 15 to 45 minutes.

In order to further illustrate the present invention and the advantages thereof, the following specific examples are given, it being understood that same are intended only as illustrative and in nowise limitative.

EXAMPLES

Technique Employed

The substrates coated with paint were immersed in 30 ml of stripper composition according to the invention at ambient temperature (20° C.) for at least 30 minutes. Performance was estimated by inspecting the effects obtained.

(A) Glycerophthalic paint + undercoat/wood

This was a mature paint which, hence, was perfectly crosslinked. When that which is herein defined as a "low-performance (o) solvent composition" was used, the glycerophthalic paint (brilliant layer) remained intact or, at most, when inspected by binoculars (magnification G=7x) several small bubbles spread over the surface could be detected. A "high-performance solvent composition (*)" produced a surface replete with large scales. The substrate was then rinsed with a water jet (mechanical action) in order to eliminate the scales which were not adhered thereto. The surface was then inspected using binoculars (G=7x). When using a "very high-performance solvent combination (**)", it was found that the undercoat layer was partially detached over the entirety of the surface.

(B) Alkyd-urethane paint/wood

As above, this was also a well matured paint and hence perfectly crosslinked. A low-performance solvent composition produced no observable effect at the surface and the paint retained its brilliant finish. For a high-performance solvent composition (*), the surface was covered with scales, but these could not be detached even after intensive washing with water. Contrariwise, after immersion in a very high-performance solvent composition (**) it was observed that a simple water jet permitted essentially all of the scales formed to be removed.

(C) Acrylic-polyurethane/aluminum paint

Using a low-performance solvent composition, only a beginning of stripping was observed, around the edges of a board. After one hour, there was no improvement in stripping. A very high-performance solvent composition (**) provided detachment of the entire film in less than 15 minutes. Using only a high-performance composition (*), several extra minutes of immersion were required in order to elicit the same effect. In this case, the film was always detached in less than 30 minutes. Whether using high-performance or very high-performance compositions, an elongation of the film by several millimeters was always observed (relative elongation <30%).

(D) Epoxy/aluminum paint

After immersion for 1 hour, a softening of this very resistant paint was observed using high-performance compositions (*). Simple scraping was then sufficient to remove it with relative ease. A very high-performance solvent stripper composition (**) based on formic acid, via its mechanism of chemical action, did completely remove the epoxy layer without any scraping being required.

Six aprotic polar solvents and five ethers were tested singly and in combination, in a volume ratio of about 10/90.

Below, for the four paint and substrate compositions indicated above, the action of the mixtures of compositions according to the present invention is given and compared with the action of a composition according to the prior art. The composition according to the prior art was a mixture of methylene chloride/$CH_3OH$ in a volume ratio of about 90/10.

| Ethers tested: | |
|---|---|
| THF | tetrahydrofuran |
| Dx | dioxane |
| $Et_2O$ | diethylether |
| MTBE | methyl-tert-butylether |
| TAME | tert-amylmethylether |
| Aprotic polar solvents: | |
| DMSO | dimethylsulfoxide |
| DMF | dimethylformamide |
| NMP | N-methylpyrrolidone |
| NMm | N-methylmorpholine |
| BLo | γ-butyrolactone, |
| AcN | acetonitrile |

EXAMPLE 1:
Glycerophthalic paint + undercoat/wood:

| 10% | — | 90% | | | |
|---|---|---|---|---|---|
| | | $Et_2O$ | MTBE | TAME | $CH_2Cl_2$ |
| — | — | o | o | o | — |
| DMSO | ** | ** | ** | ** | — |
| MeOH | — | — | — | — | * |

EXAMPLE 2:
Alkyd-urethane paint/wood:

| 10% | — | 90% | | | |
|---|---|---|---|---|---|
| | | $Et_2O$ | MTBE | TAME | $CH_2Cl_2$ |
| — | — | * | c | o | — |
| DMSO | * | ** | ** | ** | — |
| MeOH | — | — | — | — | ** |

EXAMPLE 3:
Alkyd-urethane paint/wood:

| 10% | — | 90% THF | CH$_2$Cl$_2$ |
|---|---|---|---|
| DMSO | * | ∘ ** | — |
| DMF | ** | ** | — |
| NMP | ** | * | — |
| NMm | * | * | — |
| BLo | ∘ | * | — |
| AcN | ∘ | * | — |
| MeOH | — | — | ** |

EXAMPLE 4:
Acrylic-polyurethane paint/aluminum:

| 10% | — | 90% THF | Dx | CH$_2$Cl$_2$ |
|---|---|---|---|---|
| — | — | * | * | — |
| DMSO | * | ** | ** | — |
| MeOH | — | — | — | * |

EXAMPLE 5:
Acrylic-polyurethane paint/aluminum:

| 10% | — | 90% THF | CH$_2$Cl$_2$ |
|---|---|---|---|
| — | — | * | — |
| DMF | ** | ** | — |
| NMP | * | ** | — |
| NMm | * | ** | — |
| BLo | ∘ | ** | — |
| AcN | ∘ | ** | — |
| MeOH | — | ** | * |

EXAMPLE 6:
Epoxy paint/aluminum:

| 10% | — | Et$_2$O | 90% MTBE | TAME | CH$_2$Cl$_2$ |
|---|---|---|---|---|---|
| — | — | ∘ | ∘ | ∘ | — |
| DMSO | * | * | * | * | — |
| MeOH | — | — | — | — | * |

EXAMPLE 7

This example relates to a composition containing a fluorinated surfactant. By volume, the composition contained 90% MTBE, 5% of DMSO and 5% of FORAFAC® 1110. This composition, when applied onto glycerophthalic paint + undercoat on a wood substrate, displayed extremely good performances (**).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the removal of paint from a substrate coated therewith comprising contacting an effective stripping amount of a composition, which comprises (a) from 1% to 20% by volume of dimethylsulfoxide and (b) from 99% to 80% by volume of an ether selected from among methyl-tert-butylether, tert-amylmethylether, tetrahydrofuran, dioxane and mixtures thereof, with said paint coated substrate; allowing said paint to swell, form blisters and become detached; and removing at least a portion of said paint from said substrate.

2. The process as defined by claim 1, wherein said composition comprises from 5% to 15% of said dimethylsulfoxide and from 95% to 85% by volume of said ether.

3. The process as defined by claim 1, wherein said dimethylsulfoxide and said ether are in a ratio by volume of about 10/90.

4. The process as defined by claim 1, wherein said ether comprises methyl-tert-butylether, tert-amylmethylether or mixtures thereof.

5. The process as defined by claim 1, wherein said ether comprises methyl-tert-butylether.

6. The process as defined by claim 1, wherein said ether comprises tetrahydrofuran, dioxane or mixtures thereof.

7. The process as defined in claim 1, wherein said composition further comprises a fluorinated surfactant.

8. A process for the removal of a glycerophthalic paint surface layer from a wood substrate coated therewith, comprising contacting such surface layer with an effective stripping amount of a composition comprising (a) from 1% to 20% by volume of dimethylsulfoxide and (b) from 99% to 80% by volume of an ether selected from among diethylether, methyltert-butylether, tert-amyl-methylether or mixtures thereof; allowing said paint to swell, form blisters and become detached; and removing at least a portion of said paint from said substrate.

9. A process for the removal of an alkyd-urethane paint surface layer from a wood substrate coated therewith, comprising contacting such surface layer with an effective stripping amount of a composition comprising (a) from 1% to 20% by volume of dimethylsulfoxide and (b) from 99% to 80% by volume of an ether comprises diethylether, methyl-tertbutylether, tert-amyl-methylether or mixtures thereof; allowing said paint to swell, form blisters and become detached; and removing at least a portion of said paint from said substrate.

10. A process for the removal of an alkyd-urethane paint surface layer from a wood substrate coated therewith, comprising contacting such surface layer with an effective stripping amount of a composition comprising from 99% to 80% by volume of tetrahydrofuran and from 1% to 20% by volume of a solvent selected from among dimethylsulfoxide, dimethylformamide, N-methyl-pyrrolidone, N-methyl-morpholine, γ-butyrolactone, acetonitrile or mixtures thereof; allowing said paint to swell, from blisters and become detached; and removing at least a portion of said paint from said substrate.

11. A process for the removal of an acrylic-polyurethane paint surface layer from a metal substrate coated therewith, comprising contacting such surface layer with an effective stripping amount of a composition comprising (a) from 1% to 20% by volume of dimethylsulfoxide, and (b) from 99% to 80% by volume of an ether selected from among tetrahydrofuran, dioxane or mixtures thereof; allowing said paint to swell, form blister and become detached; and removing at least a portion of said paint from said substrate.

12. A process for the removal of an acrylic-polyurethane paint surface layer from a metal substrate coated therewith, comprising contacting such surface layer with an effective stripping amount of a composition comprising from 99 to 80% by volume of tetrahydrofuran and from 1% to 20% by volume of a solvent selected from among dimethylsulfoxide, dimethylformamide, N-methyl-pyrrolidone, N-methyl-morpholine, γ-butyrolactone, acetonitrile or mixtures thereof; allowing said paint to swell, from blisters and become detached; and removing at least a portion of said paint from said substrate.

13. A process for the removal of an epoxy paint surface layer form a metal substrate coated therewith, comprising contacting such surface layer with an effective stripping amount of a composition comprising from 99% to 80% by volume of tetrahydrofuran and from 1% to 20% by volume of a solvent selected from among dimethylsulfoxide, dimethylformamide, N-methyl-pyrrolidone, N-methyl-morpholine, γ-butyrolactone, acetonitrile or mixtures thereof; allowing said paint to swell, from blisters and become detached; and removing at least a portion of said paint from said substrate.

* * * * *